United States Patent [19]

Javan

[11] Patent Number: 5,068,864
[45] Date of Patent: Nov. 26, 1991

[54] LASER FREQUENCY STABILIZATION

[75] Inventor: Ali Javan, Cambridge, Mass.

[73] Assignee: Laser Science, Inc., Cambridge, Mass.

[21] Appl. No.: 518,796

[22] Filed: May 4, 1990

[51] Int. Cl.$^5$ .............................................. H01S 3/13
[52] U.S. Cl. ...................................... 372/32; 372/38; 372/29; 372/20
[58] Field of Search ...................... 372/29, 32, 28, 38, 372/20

[56] References Cited

U.S. PATENT DOCUMENTS

| | | | |
|---|---|---|---|
| 3,593,189 | 7/1971 | Buhrer | 372/32 |
| 3,686,585 | 8/1972 | Javan et al. | 331/94.5 |
| 3,842,367 | 10/1974 | Schlossberg | 372/32 |
| 3,921,099 | 11/1975 | Abrams et al. | 372/32 |
| 4,592,058 | 5/1986 | Mongeon et al. | 372/32 |
| 4,853,935 | 8/1989 | Lainé et al. | 372/32 |
| 4,856,009 | 8/1989 | Hall et al. | 372/32 |
| 4,897,843 | 1/1990 | Scott | 372/32 |

OTHER PUBLICATIONS

A. Gatterer, S. J., H. W. Thompson, V. A. Fassel, F. A. Miller; Spectrochimica Acta; 1960; pp. 570–574.
E. L. Muetterties; Inorganic Syntheses; pp. 158–161.

Primary Examiner—William L. Sikes
Assistant Examiner—Susan S. Morse
Attorney, Agent, or Firm—Fish & Richardson

[57] ABSTRACT

In one aspect, frequency fluctuations are stabilized in a laser beam using a frequency stabilization stage that includes a modulator for dithering (i.e., periodically scanning) the frequency of the laser beam, and absorption resonance cell that has a resonance at a predetermined linewidth to which the dithered beam is applied. The output of the cell is synchronously demodulated with respect to the dithering to produce a correction signal that represents the frequency fluctuations with respect to a reference frequency within the absorption linewidth, and the correction signal is used in a configuration which corrects for the frequency fluctuations and produces from the stage a non-dithered, frequency stabilized output. In another aspect, the frequency of the laser beam is controlled using the molecular or atomic resonances of a plurality of successive frequency stabilization stages. Each stage includes an independent control servo loop incorporating a respective absorption resonance cell and constructed to produce frequency correction referenced upon a predetermined resonance of the absorption cell, and the predetermined reference resonances of successive absorption cells have successively narrower linewidths. Each successive frequency stabilization stage, referenced on its predetermined resonance, serves to reduce the range of frequency fluctuations of its output relative to its input.

17 Claims, 6 Drawing Sheets

LASER FREQUENCY STABILIZATION

BACKGROUND OF THE INVENTION

This invention relates to controlling the frequency of a laser signal, and particularly to removing frequency fluctuations from the laser signal.

It is well known to stabilize laser frequency (i.e., minimize frequency fluctuations known as frequency jitter) by electromechanically tuning the laser resonator in response to the instantaneous frequency of the laser beam. A control signal that is a function of errors between the detected laser frequency and a frequency-stable reference signal (such as the output of another laser or the center frequency of a high-Q atomic or molecular resonance) is applied to a piezoelectric transducer (i.e., a PZT) to move the mirror electromechanically and tune the laser resonator, thereby adjusting laser frequency. The PZT response is generally slow and has resonances at sharp frequencies in the audio region, thereby making it difficult to achieve the nearly flat bandwidth response desirable for frequency stabilization. However, the use of a PZT is generally satisfactory for removing the frequency jitter requiring control with a response bandwidth of tens or even hundreds of Hz.

It is also generally known that high speed laser frequency tuning can be achieved using an electro-optic crystal within the laser resonator. The refractive index of the electro-optic crystal is controlled by applying a DC voltage, such as the control signal discussed above, to the crystal, thereby causing the laser frequency to change and achieving frequency stabilization.

Some applications, such as the use of the laser as an optical clock in, e.g., aircraft, subject the resonator to acoustics, microphonics, and shock forces from aircraft maneuvers which cause considerable frequency fluctuations in the laser frequency. In a $CO_2$ laser, for example, the frequency fluctuations can have swings as high as hundreds of KHz or higher and occur at fluctuation rates as high as several KHz or higher (i.e., the fluctuations can have a time scale on the order of milliseconds or less). Because PZT stabilization is generally suitable to compensate slower fluctuations, complex laser shock mounting and mechanical isolation arrangements are typically needed to aid in laser frequency stabilization.

Another known scheme for removing high-frequency jitter in tunable CW (continuous wave) lasers (such as dye lasers) is to generate an RF (radio frequency) sideband of the laser frequency using an acousto-optic or electro-optic modulator driven at, e.g., an RF frequency by a tunable voltage controlled oscillator (VCO). A sample of the laser beam is applied to an external high-Q Fabrey-Perot interferometer to produce a frequency error signal from a resonance of the interferometer. This error signal is used to tune the VCO, and hence the frequency of the RF sideband. But in a high vibration environment, the resonance of the external high-Q Fabrey-Perot interferometer is also subject to much the same variation as that of the laser resonator.

One known technique for generating a high-Q atomic or molecular resonance for laser frequency stabilization uses laser saturation spectroscopy. In this method, the laser beam is applied to an absorption resonance cell that contains atoms or molecules of gas at a predetermined pressure. The beam is reflected by mirrors in the absorption cells to establish a pair of oppositely-propagating, collinear waves in the gas. As the laser frequency is tuned across the Doppler profile of the atomic or molecular spectral line, high-Q resonance is established at the center of the Doppler profile which has a linewidth (in frequency) sizably narrower than the Doppler profile. This linewidth is a characteristic of the molecules (or atoms) which make up the gas and is a function of such factors as pressure effect and power broadening, but it is free from Doppler broadening.

The resonance of the cell defines a reference for the laser frequency and is used to extract a correction (i.e., error) signal which is applied to the laser frequency-tuning element to achieve frequency stabilization. To compensate for frequency fluctuations and thus achieve stabilization, the resonance linewidth should be narrow to yield a highly accurate and well defined frequency reference. However, high-speed frequency fluctuations and transients present under a vibration environment cannot be eliminated if they occur in a time scale comparable to the inverse of the narrow resonance linewidth. Thus, a narrow linewidth, desirable for high frequency definition and accuracy, limits the maximum jitter frequency rate that can be corrected when the laser is operated in a high vibration environment in which high speed fluctuations occur. As a result, while this frequency stabilization scheme is suitable for quiet laboratory environments, when the laser is used as a reference optical clock in an environment where excessive vibration exists, it is necessary to provide hard-to-achieve mechanical isolation from vibration (shock mounting) which adds to the size and weight of the optical clock system and is thus undesirable.

Lasers which are frequency-stabilized by the above-discussed laser saturation spectroscopy technique are typically frequency-dithered (i.e., periodically scanned in frequency) at a predetermined rate to extract the correction signal from the absorption resonance cell. Although the output of the clock will be stable, it will have an FM dither at the dither frequency rare. To enable the production of a frequency-stabilized non-dithered beam, the output beam of a second laser (which is not dithered) is typically stabilized against the dithered beam of the first laser. The output of the second laser is used as the non-dithered stable frequency clock.

One conventional method for extracting the correction signal in systems where the frequency of the laser beam is dithered uses a synchronous demodulator (i.e., a so-called "lock-in amplifier", also known as a phase sensitive amplifier) synchronized at the dither frequency to demodulate the output (i.e., the absorption response) of the absorption cell. In other known schemes in which the dithered laser frequency is scanned across the reference resonance of the cell, the absorption response of the reference resonance is digitally sampled to sense the center frequency of the resonance (that is, the frequency at which maximum absorption occurs). The samples are used to develop the correction signal, which is then applied to the laser tuning mechanism to achieve frequency stabilization.

It is also known to modify the absorption response of a molecular resonance by applying a DC electric field to the molecules in the absorption cell; this is known as the Stark effect. Such a technique has been used as an alternative to dithering the frequency of the laser beam to extract the correction signal for stabilizing the laser frequency. In this method, the DC electric field is amplitude modulated at the dither frequency, thereby modulating the absorption response at the dither frequency. The correction signal is extracted from the modulated absorption response with a synchronous demodulator synchronized to the dither frequency.

SUMMARY OF THE INVENTION

One general aspect of the invention is stabilizing frequency fluctuations in a laser beam using a frequency stabilization stage that includes a modulator external to the laser for dithering (i.e., periodically scanning) the frequency of the laser beam, and an absorption resonance cell that has a resonance at a predetermined linewidth to which the frequency-dithered beam is applied. A synchronous demodulator synchronized to the dithering produces a correction signal that represents the frequency fluctuations with respect to a reference frequency within the linewidth by demodulating the output of the absorption cell. The correction signal is used in a configuration which corrects for the frequency fluctuations and produces as an output of the stage a non-dithered, frequency-stabilized beam.

Because the output beam is non-dithered, as well as being frequency stabilized, it is highly suitable for use as, e.g., a frequency reference.

Preferred embodiments include the following features.

In one embodiment, the configuration in which the correction signal includes a device associated with the laser which responds to the correction signal to cause the frequency fluctuations to be stabilized in the beam produced by the laser. The device is, e.g., a piezo-electric transducer (PZT) mounted to a laser mirror, or an electro optical crystal disposed within the laser, for tuning the laser frequency in response to the correction signal.

In another embodiment, the correction signal is used in a configuration that includes a modulator which generates a sideband of the laser beam that serves as the output of the stabilization stage. A voltage controlled oscillator applies a modulation signal to the sideband modulator to cause the modulator to produce the sideband at a frequency shifted from a nominal frequency of the laser beam, and the correction signal is used to tune the voltage controlled oscillator and cause the frequency fluctuations to be stabilized in the sideband. This configuration is particularly useful in cases where the reference frequency within the linewidth is different from the nominal frequency of the laser beam; the frequency shift produced by the sideband modulator is selected to be equal to this difference.

Another general aspect of the invention is controlling the frequency of a laser beam that is subject to frequency fluctuations, using a plurality of successive frequency stabilization stages, each of which comprises an independent control loop incorporating a respective absorption resonance cell and constructed to produce frequency correction referenced upon a predetermined resonance of the absorption cell. The predetermined reference resonances of successive absorption resonance cells have successively narrower absorption linewidths, and each successive frequency stabilization stage, referenced to its respective resonance, serves to reduce the range of frequency fluctuations of its output relative to its input.

Because frequency stabilization is achieved in successive stages, the resonance linewidth in the first stage can be made sufficiently broad to provide stabilization against high speed frequency fluctuations. Although the frequency of the beam produced by the first stage will not have high accuracy (because of the broad linewidth of the resonance of that stage), the successive stages, with narrower resonances, will remove the remaining frequency fluctuations. A final stage, having the narrowest linewidth, will serve to determine the frequency accuracy of the stable output beam.

Preferred embodiments include the following features.

One or more of the successive frequency stabilization stages may be constructed according to any of the configurations discussed above. In one embodiment, the correction signals extracted by the frequency control loops from their respective absorption resonance cells are each applied to tune the laser. For example, the correction signal from one frequency control loop is applied to adjust the refractive index of an electro-optic crystal in the laser, while the correction signal produced by another frequency control loop controls the movement of a PZT to which a laser mirror is mounted.

In another embodiment, rather than dithering the frequency of the laser to cause the correction signal to be extracted from the absorption resonance cell, the absorption response of the cell is dithered (such as by amplitude modulating, at the dither frequency, a DC electric field applied across the molecules of the absorption medium). A demodulator synchronized to the dithering demodulates the dithered absorption response to extract the correction signal.

The dither modulator can be an electro-optical (EO) modulator driven by a periodic voltage at the dither frequency along an axis of the EO crystal which causes a phase shift in the laser light transmitted through the crystal. As a result, the transmitted beam is phase modulated (and thus frequency modulated) at the dither frequency. Alternatively, the dither modulator is an acous-to-optic (AO) modulator driven with, e.g., a frequency dithered RF modulation signal, thereby causing a frequency dithered sideband to be generated. When an AO modulator is used, the modulator includes a pair of crystals to which the beam is successively applied. The crystals are arranged so that beam deflection caused by one crystal is offset by a deflection produced by the other crystal.

In another feature of the invention, the power level of the laser beam is stabilized before the beam is applied to an absorption resonance cell. This reduces distortion of the absorption linewidth that is due to power fluctuations in the beam. The power stabilized beam can then be applied directly to the absorption cell, or it can be applied to the cell after being modulated by a dither modulator.

The power level stabilization arrangement includes a modulator for generating a sideband of the beam in response to a modulation signal from a voltage controlled oscillator (VCO). The level of the modulation signal is controllable (e.g., with a voltage controlled attenuator or a variable gain amplifier). Power level variations in the sideband are detected, and in response the level of the modulation signal is varied in a manner which corrects for the power level variations in the sideband, thereby stabilizing the sideband's power level.

In one embodiment, a detector compares the power level of the sideband to a fixed and stable reference voltage to detect the power level variations. In another embodiment, the power level variations are detected by amplitude modulating the sideband at a predetermined rate and then demodulating the amplitude modulated sideband with a demodulator synchronized to the predetermined rate to produce an error signal representative of the power level variations.

The laser is preferably a gas laser. In one embodiment, the lasing medium includes carbon dioxide ($CO_2$) molecules using the carbon-12 isotope, and the absorbing medium of the absorption resonance cell includes molecules of sulfur hexafluoride ($SF_6$). In another embodiment, the absorbing medium includes molecules of osmium tetroxide ($OsO_4$). In still another embodiment, the $CO_2$ lasing medium includes the carbon-13 isotope, and the absorbing medium of the absorption resonance cell includes molecules of sulfuryl fluoride ($SF_2O_2$). In embodiments in which the absorption response of the absorption cell is dithered, the cell preferably includes molecules of Duetrated ammonia ($NH_2O$).

Other features and advantages of the invention may become apparent from the following detailed description, and from the claims.

DESCRIPTION OF THE PREFERRED EMBODIMENTS

We first briefly describe the drawings.

STRUCTURE AND OPERATION

Figure 1:
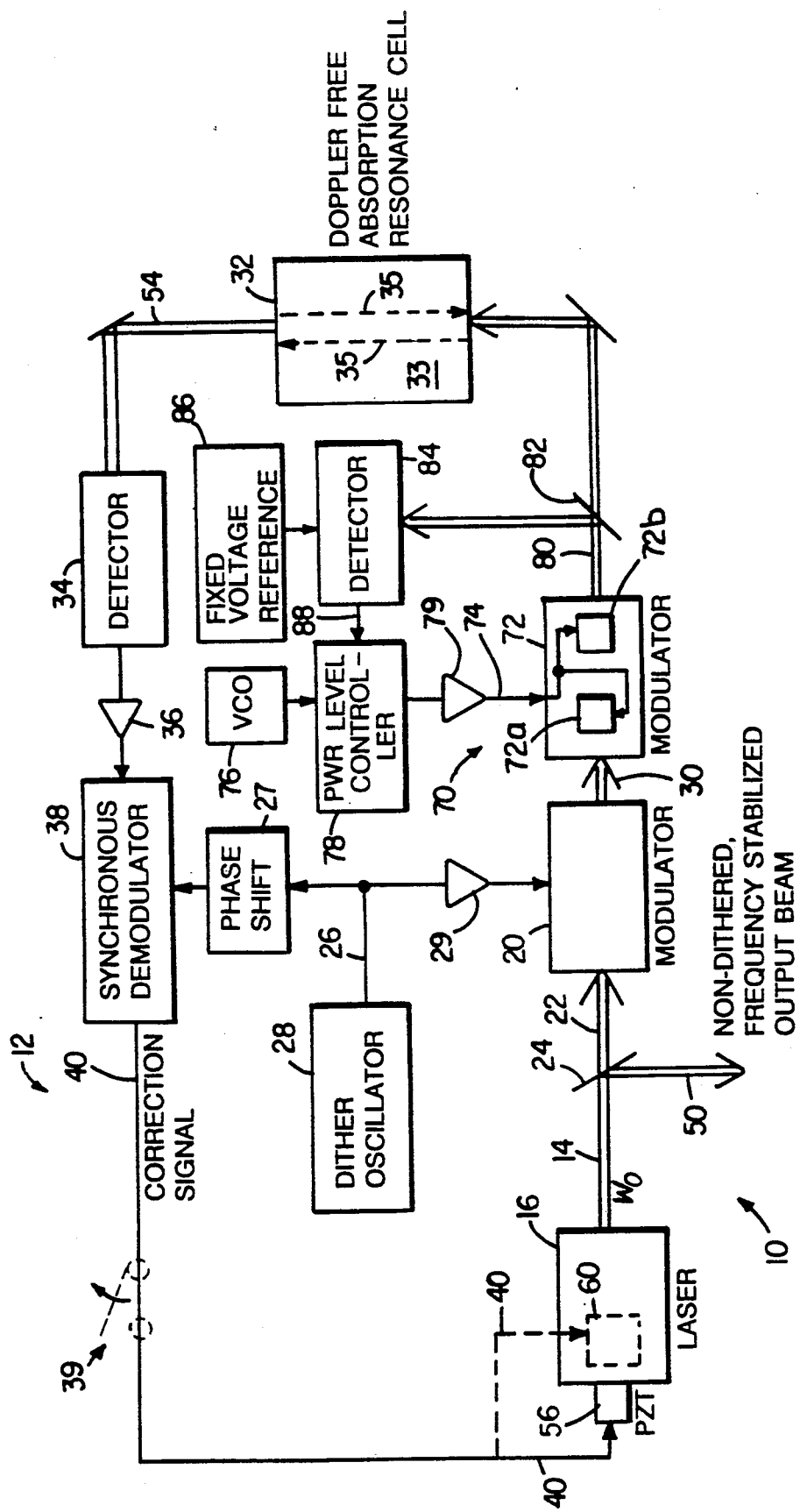
FIG. 1 is a block diagram of a laser system according to the invention which produces a frequency stabilized, dither-free output beam.

Referring to FIG. 1, laser system 10 includes a frequency control servo loop 12 for stabilizing frequency fluctuations (i.e., frequency jitter) from a beam 14 produced by laser 16. Servo loop 12 includes a modulator 20 (e.g., an electro-optical modulator comprising a CdTe crystal) that receives a beam 22 extracted from laser output beam 14 by beamsplitter 24, and modulates the frequency of beam 22 with a modulation signal 26 produced by dither oscillator 28 and applied to modulator 20 via amplifier 29.

The modulated beam 30 is applied (via modulator 72 for purposes to be discussed) to Doppler-free absorption resonance cell 32. The output (i.e., the absorption response) of absorption resonance cell 32 is detected 34, amplified 36, and applied to synchronous demodulator 38. Modulation signal 26 is also applied to synchronous demodulator 38 after being phase shifted 27 to compensate for the time delay introduced by the modulators, absorption resonance cell 32, detector 34 and amplifier 36.

Synchronous demodulator extracts a correction signal 40 by demodulating the output of cell 32 with respect to the synchronized modulation signal. Correction signal 40 is used in a manner described in detail below to correct for the frequency fluctuations in beam 14. It is important to note that laser 16 is not dithered. Thus, laser beam 14 is a non-dithered beam stabilized from the frequency fluctuations by the correction signal 40 generated by servo loop 12. Beamsplitter 24 directs most of beam 14 as the output 50 of system 10.

Figure 2:
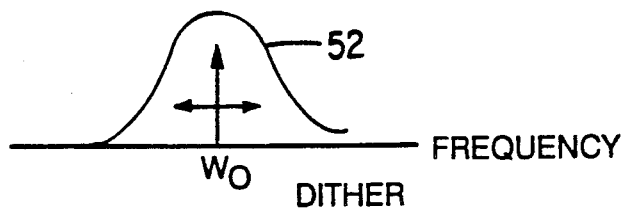
FIGS. 2 and 3 are waveforms useful in understanding the system of FIG. 1.

Referring also to FIG. 2, laser 16 is a continuous wave (CW) laser, for example a 10.8 $\mu$m $^{12}C^{16}O_2$ laser (i.e., an infrared laser that uses the carbon-12 isotope in the carbon dioxide lasing medium), and generates beam 14 at a nominal frequency $\omega_o$. The dither frequency of modulation signal 26 is, e.g., 100 KHz, and thus modulated beam 30 has an instantaneous frequency that oscillates about $\omega_o$ as shown in FIG. 2.

Absorption resonance cell 32 contains an absorption medium 33 that is selected to provide cell 32 with a resonance linewidth 52 that has a center frequency near the P(20) line of $CO_2$ laser 16. For example, cell 32 contains sulfur hexafluoride ($SF_6$) gas, and the P(56) $A_2^3$ transition belonging to the $\nu_3$ band of $SF_6$ occurs at a center frequency that is sufficiently close to that of the P(20) line. Absorption medium 33 is held at a pressure selected to provide linewidth 52 with a relatively large breadth (e.g., between 100 KHz and 1 MHz). This allows loop 12 to respond to large frequency fluctuations on the laser beam from the nominal frequency $\omega_o$.

In operation, consider that a switch 39 is placed in the path of correction signal 40 and is opened, as shown in phantom in FIG. 1. Laser beam 14 (and dithered beam 30) will thus include frequency fluctuations (i.e., frequency jitter) caused by such conditions as mechanical vibration, as explained above. These frequency fluctuations may be large in magnitude as well as rapidly occurring. The breadth of linewidth 52 is selected to be sufficiently large so that even large variations from the nominal frequency of the beam applied to cell 32 are within linewidth 52. Also, the speed of response of servo loop 12 is sufficiently high to respond to even high speed variations in the frequency fluctuations.

The dithered beam applied to cell 32 saturates absorption medium 33 to establish a pair of counter-propagating, collinear waves 35 within the cell and generate absorption linewidth 52. The dithering on beam 30 causes the beam to probe the peak of linewidth 52 at the dither frequency. As a result, the absorption response of cell 32 is frequency modulated at the dither frequency and includes the frequency fluctuations present on laser beam 14. Detector 34 converts the output 54 provided by cell 32 to an electrical signal, the level of which is boosted by amplifier 36 before the signal is applied to synchronous demodulator 38.

Figure 3:
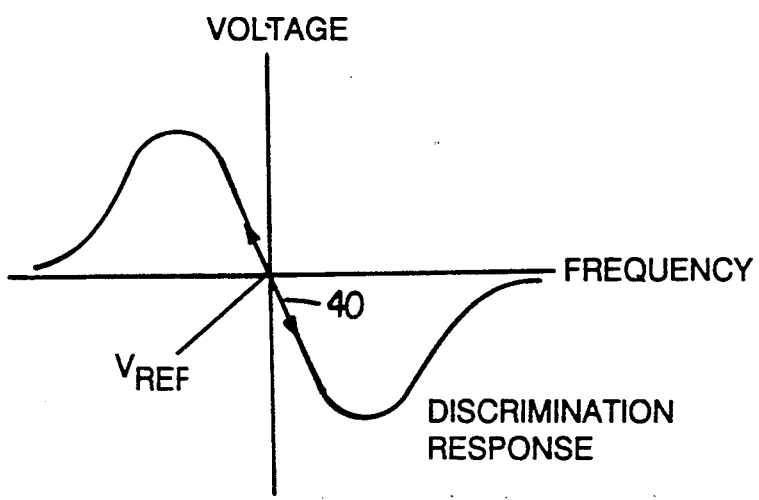

Referring also to FIG. 3, the same 100 KHz dither signal 26 that is used to dither beam 22 is applied (after being phase shifted 27 to compensate for the phase difference between the dither signal at the output of modulator 28 and the dither frequency component on the signal applied to demodulator 38 from absorption cell) to synchronous demodulator 38 for use as a reference frequency in demodulating the output 54 of cell 32. The response bandwidth of synchronous demodulator 38 serves as a filter to remove the 100 KHz dither frequency from the demodulated signal. As a result, the demodulated correction signal 40 (with switch 39 open) has the well known discriminator response shown in FIG. 3, with the instantaneous voltage of correction signal 40 varying about a reference voltage ($V_{ref}$) according to the frequency fluctuations on beam 14, as shown by the arrow in FIG. 3.

Correction signal 40 contains information about both the magnitude of the frequency fluctuations on beam 14 (which corresponds to the voltage level of signal 40) and the direction in which the instantaneous frequency of beam 14 must be changed to reduce the fluctuations. Thus, by closing servo loop 12 (e.g., by closing switch 39) and applying correction signal 40 with the proper phase to a device which will cause the frequency corrections to be made to beam 14, the frequency fluctuations are corrected.

One such device for receiving correction signal 40 is a piezoelectric transducer (PZT) 56 to which one of the end mirrors (not shown) of laser 16 is mounted. PZT 56 responds to correction signal 40 by tuning the laser resonator, thereby adjusting the instantaneous frequency of beam 14 in a direction that opposes the frequency fluctuations on beam 14. As a result, servo loop 12 responds to the frequency fluctuations by dynamically tuning laser 16 in an attempt to drive the level of correction signal 40 (as depicted by the arrow in FIG. 3) to $V_{ref}$. Because the dither is introduced downstream of laser 16 at modulator 20, the output 14 of laser 16, and hence system output beam 50, is non-dithered as well as being stabilized from frequency fluctuations.

Servo loop 12 also includes a power control loop 70 which compensates for power level variations in sideband 30 introduced by modulator 20 and stabilizes the power level of the beam applied to absorption resonance cell 32. Maintaining a constant power level in the beam applied to cell 32 reduces distortion in the absorption resonance response.

Power control loop 70 includes modulator 72, for example an acousto-optic modulator, which receives a modulation signal 74 from voltage controlled oscillator (VCO) 76 via power level controller 78 and amplifier 79. Power level controller 78 operates in a manner described in detail below to adjust the power level of modulation signal in response to power level variations in sideband 30 and stabilize the power level of the sideband 80 produced by modulator 72. Power level controller 78 is, e.g., a voltage controlled attenuator or a variable gain amplifier.

Because an acousto-optic crystal imparts a slight angular deviation of the sideband radiation that it produces (with respect to the beam incident on the crystal), modulator 72 includes a pair of acousto-optic crystals 72a, 72b (each made from, e.g., germanium) that are driven with modulation signal 74 in such a way that the acoustic waves established in crystals 72a, 72b are parallel but propagate in opposite directions. As a result, the angular deflection in the beam produced by crystal 72a is offset by that caused by crystal 72b. The beam 80 of sideband radiation will be slightly laterally displaced, but this is easily corrected by proper positioning of downstream optical elements. Because two crystals are used, the magnitude of the frequency shift of sideband 80 from sideband 30 is twice the frequency of modulation signal 74.

The operation of power control loop 70 is as follows. A fraction of sideband 80 is extracted by beamsplitter 82 and applied to detector 84. Detector 84 compares the power level of the sideband to a potential provided by a very stable, fixed reference source 86. This arrangement serves as a "balanced bridge" to produce a control signal 88 that accurately represents the power level variations in sideband 30. Power level controller 78 adjusts the power level of the modulation signal 74 applied to modulator 72 by an amount and in a direction that causes the power level of sideband 80 to remain constant despite power level variations in sideband 30.

The frequency of VCO 76 is selected so that the nominal (i.e., non-dithered) frequency of the sideband 80 applied to absorption resonance cell 32 is at the center of absorption linewidth 52 of the cell. Thus, the operation of servo loop 12 to stabilize the frequency of laser beam 14 is unaffected by the presence of power control loop 70.

Other Embodiments

As an alternative to PZT 56 (for example, if a faster response time is desired than can be achieved with the PZT), correction signal 40 can be applied to an electro-optic crystal 60 disposed within laser 16. Correction signal 40 causes changes in the refractive index of electro-optic crystal 60, which in turn serves to tune laser 16 to correct for the frequency fluctuations.

Figure 4:
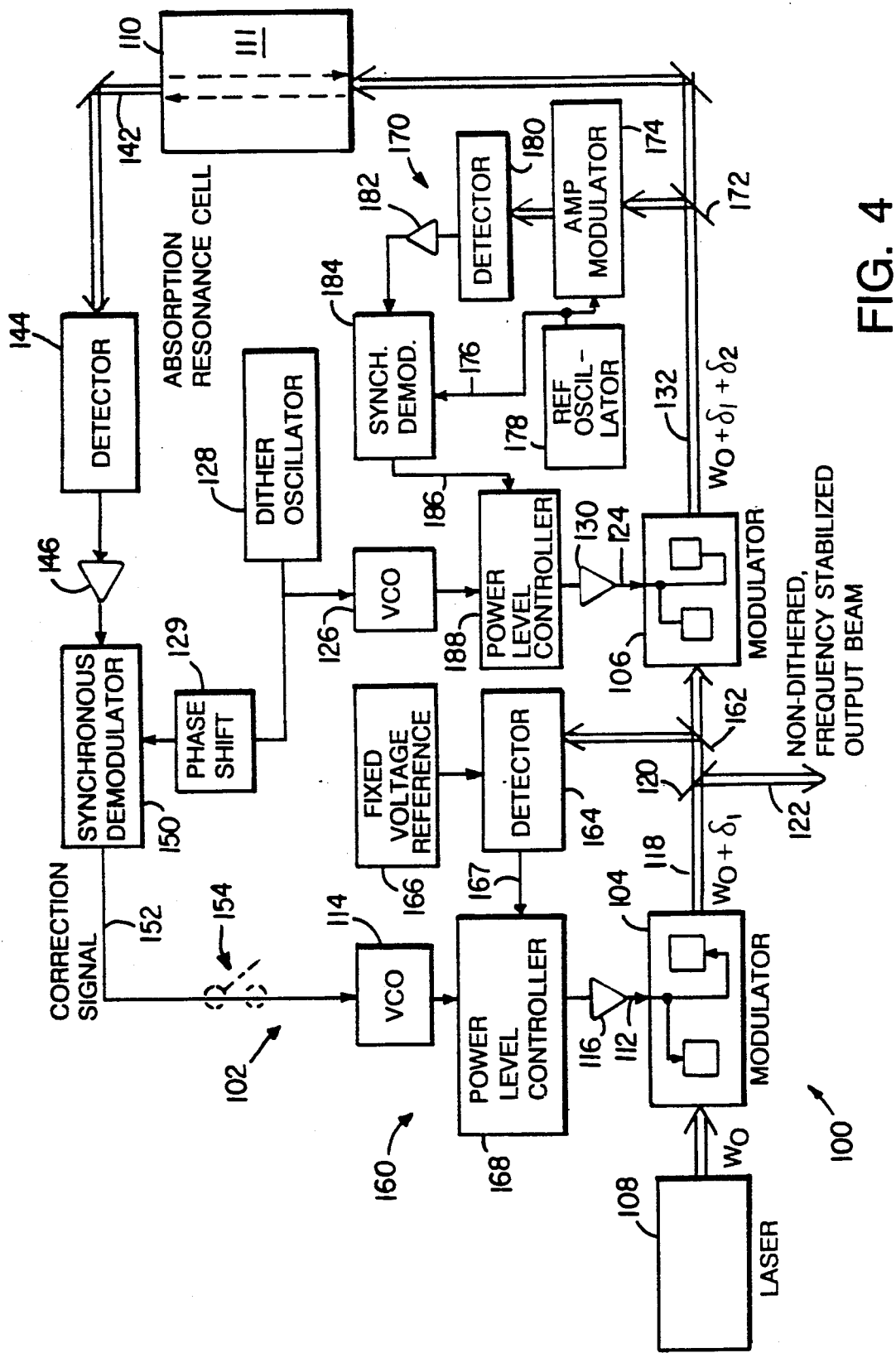
FIG. 4 is a block diagram of another embodiment of the laser system of the invention, which produces a frequency stabilized, dither-free output beam.

Referring to FIG. 4, the correction signal may be applied to correct for frequency fluctuations in a sideband of the laser beam rather than in the fundamental frequency of the beam. Laser system 100 has a frequency control servo loop 102 that includes a pair of modulators 104, 106 between $CO_2$ laser 108 and Doppler-free absorption resonance cell 110. The modulation signal 112 for modulator 104 is generated by voltage controlled oscillator (VCO) 114 and is applied to modulator 104 via amplifier 116. The output 118 of modulator 104 is, like the output beam of laser 108, non-dithered. Beamsplitter 120 applies part of beam 118 to modulator 106 and directs the remainder as the output 122 of system 100.

The modulation signal 124 for modulator 106 is produced by VCO 126, which is dithered by dither oscillator 128, and applied to modulator 106 through amplifier 130. The sideband produced by modulator 106 thus is dithered to probe the peak of the absorption resonance line established in cell 110. Cell 110 contains any suitable absorption medium 111, such as the aforementioned $SF_6$ gas.

Figure 5:
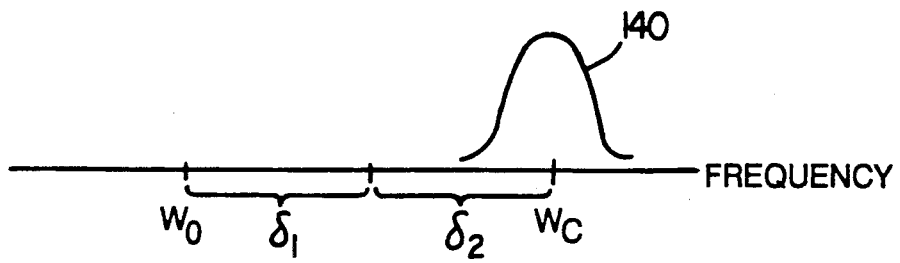
FIG. 5 is a diagram useful in understanding the operation of the system of FIG. 4.

Referring also to FIG. 5, the nominal frequency $\omega_o$ of the beam produced by laser 108 is different from the center frequency $\omega_c$ of absorption resonance linewidth 140, and the nominal frequencies of modulation signals 112, 124 are selected so that the frequency of sideband 132 is sufficiently close to center frequency $\omega_c$. For example, modulators 104, 106 split the chore of shifting the frequency of the laser beam by introducing nominal frequency shifts of $\delta_1$ and $\delta_2$, respectively, which are in the radio frequency (RF) range. Modulators 104, 106 are acousto-optic devices, and thus they each include a pair of crystals (e.g., made from germanium) driven in the manner discussed above to correct for angular deflection. Thus, the actual nominal frequencies of modulation signals 112, 124 are $\frac{1}{2}\delta_1$ and $\frac{1}{2}\delta_2$, respectively.

In operation, absorption resonance cell 110 produces an output 142 in response to the probing of absorption linewidth 140 by sideband 132. Output 142, which is frequency modulated at the frequency produced by dither oscillator 128 and which includes any frequency jitter on the laser beam, is converted to an electrical signal by detector 144, amplified 146, and applied to synchronous demodulator 150. Synchronous demodulator 150 demodulates this signal against the dither signal produced by dither oscillator 128 (and phase shifted 129 to compensate for the delay imparted by the loop) to produce correction signal 152. Correction signal 152 is applied to tune VCO 114 to change the instantaneous frequency of modulation signal 112 by an amount and in a direction that will cause frequency fluctuations to be corrected in sideband 118.

Considering once again that an open switch 154 is placed in the path of correction signal 152 to open servo loop 102, correction signal 152 has a discriminator response as shown in FIG. 3. The instantaneous voltage of correction signal 152 varies about a reference voltage ($V_{ref}$) by an amount and with a polarity that corresponds to the magnitude and direction of the frequency fluctuations on the output of laser 108. Thus, with switch 154 closed, VCO 114 responds to correction signal 152 to dynamically tune the frequency of modulation signal 112 to correct for the frequency fluctuations in sideband 118. As a result, output beam 122 is both non-dithered and stabilized from the frequency fluctuations.

Because the frequency fluctuations are corrected by servo loop 102 entirely electronically without requiring any tuning of laser 108, the response time of frequency control loop 102 is not limited by electromechanical elements (such as PZTs or electro optic crystals). Instead, response time, and hence the speed of transients and the magnitude of frequency jitter that loop 102 can compensate for, is determined by the gain of loop 102 and the total phase shift around the loop. The gain of loop 102 is a function of the linewidth of resonance absorption cell 110, and increases with decreasing linewidth. The broad bandwidths obtainable for VCOs 114, 126 and synchronous demodulator 150, all of which are commercially available devices, minimize the phase shift of loop 102, such as to less than the time scale of transients that loop 102 is designed to compensate for (e.g., 10 microseconds). Thus, speeds of response approaching a sizable fraction (such as 10%) or more) of the linewidth of resonance absorption cell 110 are obtained.

Note that modulator 104 could be used to produce the entire frequency shift (i.e., $\delta_1 + \delta_2$). If this is done, VCO 126 can be removed and the dither signal produced by oscillator 128 applied directly to modulator 106.

Servo loop 102 also includes a pair of power control loops 160, 170 for stabilizing the power levels of respective sidebands 118 and 132, thereby minimizing distortion of absorption linewidth 140 due to power fluctuations in the beam incident on absorption cell 110.

Power level control loop 160 has generally the same construction as power level control loop 70 (FIG. 1) discussed in detail above. Thus, power level fluctuations in sideband radiation 118 are detected by detector 164, which operates using a stable, fixed voltage reference 166. The control signal 167 generated by detector 164 represents the power level variations in sideband 118, and is applied to power level controller 168 (e.g., a variable gain amplifier or a voltage controlled attenuator). Power level controller 168 responds to control signal 167 by adjusting the level of the modulation signal produced by VCO 114 by a magnitude and in a direction (i.e., an increase or decrease) which causes the power level of sideband 118 to be stabilized.

Power level control loop 170 operates according to the same principles to stabilize the power level of sideband 132. Beamsplitter 172 applies a fraction of sideband radiation 132 to amplitude modulator 174, which is, e.g., an electro-optic device which modulates the amplitude of the radiation in response to a modulation signal 176 from reference oscillator 178. Modulation signal 176 is, e.g., in the RF or audio frequency range. The amplitude modulated radiation is detected 180, amplified 182, and applied to synchronous demodulator 184. Modulation signal 176 is also applied to synchronous demodulator 184 after being phase shifted to compensate for the delay of loop 170.

The correction signal 186 produced by synchronous demodulator 184 has a discriminator response, and thus if loop 170 is opened (not shown) between demodulator 184 and power level controller 188, the amplitude of correction signal 186 varies with power level fluctuations in sideband radiation 132 in the same manner as control signal 40 (FIG. 3) varies in response to frequency fluctuations. Power level controller 188 (e.g., a voltage controlled attenuator or a variable gain amplifier) responds to control signal 186 by changing the level of the modulation signal from VCO 126 in a direction and by an amount that causes the power level of sideband radiation 132 to be stabilized.

Figure 6:
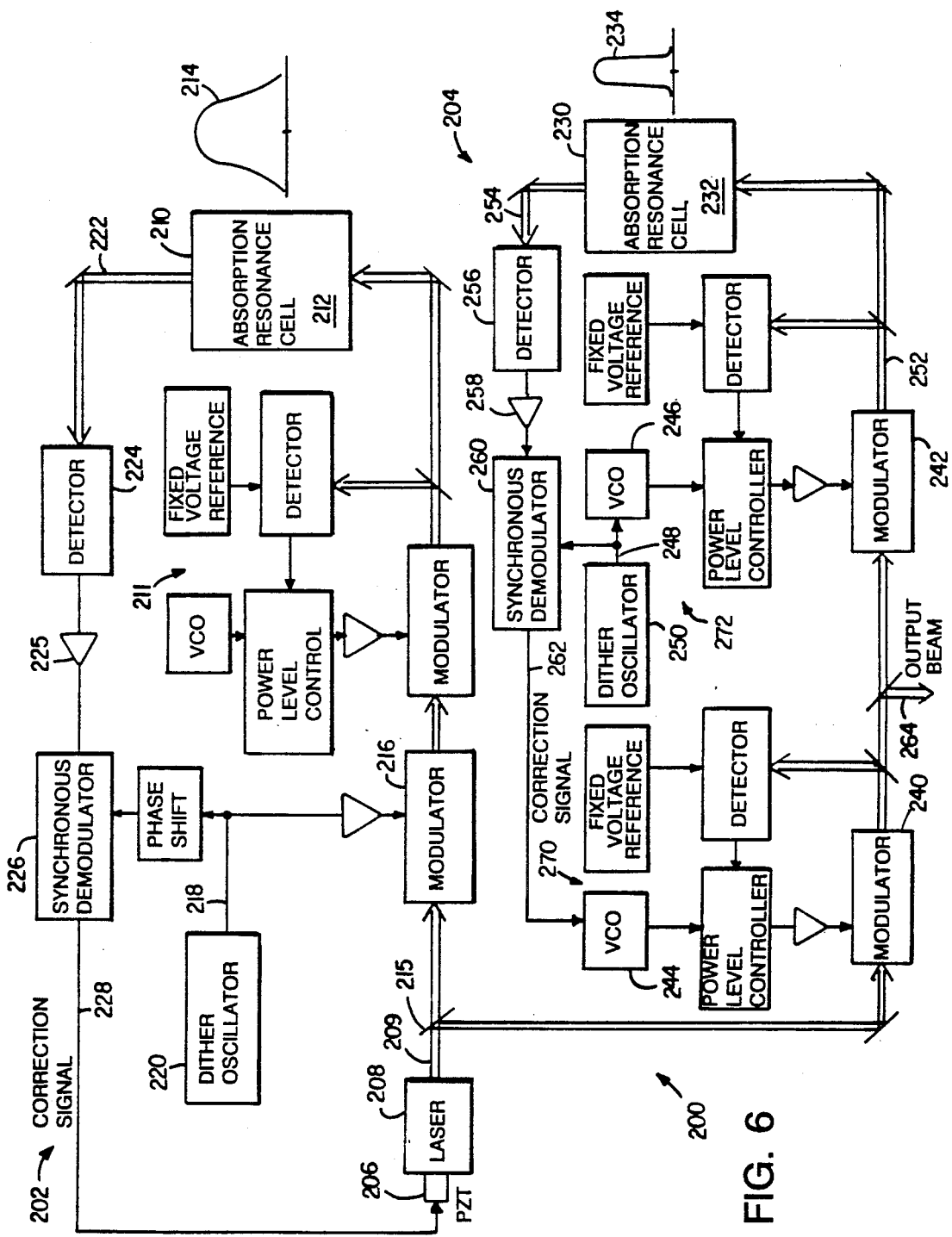
FIG. 6 is a block diagram of a two-stage, sequential system for controlling the frequency of a laser according to another aspect of the invention.

Referring to FIG. 6, laser system 200 includes multiple frequency stabilization servo loops 202, 204 for controlling the frequency of a beam produced by $CO_2$ laser 206. Frequency control loop 202 is shown as being identical to servo loop 12 (see FIG. 1) and controls PZT 206 on laser 208, but other configurations can be used instead. Servo loop 204 has the same general configuration as frequency control loop 102 of FIG. 4.

Absorption resonance cells 210, 230 of respective frequency control loops 202, 204 have successively narrower resonance linewidths. For example, the absorption medium 212 (e.g., the aforementioned $SF_6$) and parameters of cell 210 such as the pressure of medium 212 are selected to yield an absorption linewidth of, e.g., between 500 KHz and 1 MHz. Cell 230 has an absorption linewidth of, e.g., less than 100 KHz and possibly as low as 1 KHz to 10 KHz, which is produced as a function of the composition of absorption medium 232 (such as $SF_6$), the pressure of medium 232, and (at very low pressures) the diameter of the beam in cell 230.

The center frequency of linewidth 214 is approximately equal to the frequency of, e.g., the P(20) line of the beam produced by laser 208, and as a result, the modulation signal applied to modulator 216 of frequency control loop 202 is simply the dither signal (e.g., 100 KHz) produced by dither oscillator 220. The output 222 of absorption cell 210 is detected 224, amplified 225, and then applied to synchronous demodulator 226 for demodulation against dither signal 218 (phase shifted as discussed above). The resultant correction signal 228 is applied to PZT 206 to tune laser 208 and correct for the frequency fluctuations in beam 209. Thus, beam 209 is a non-dithered beam stabilized against large magnitude frequency fluctuations (e.g., fluctuations having amplitudes within the 100 KHz to 1 MHz spanned by linewidth 214).

Frequency control servo loop 202 also includes a power control loop 211 to stabilize the power level of the beam applied to absorption cell 210. Power control loop 2 is shown as being identical to, and operates in the same way as, power control loop 70 (FIG. 1), but alternative configurations, such as that of loop 170 (FIG. 4) can be used instead.

Beamsplitter 215 applies the major part of beam 209 to absorption resonance cell 230 in servo loop 204 via modulators 240, 242. VCO 244, which is tuned by the correction signal 262 of frequency control loop 204, provides the modulation signal for modulator 240. Likewise, VCO 246, which is tuned by the dither signal 248 (e.g., at 10 KHz) from dither oscillator 250, supplies the modulation signal for modulator 242. The nominal frequencies of these modulation signals are selected so that sideband 252 from modulator 242 has a nominal frequency sufficiently close to the center frequency of absorption linewidth 234.

The output 254 produced by cell 230 in response to the probing of linewidth 234 is synchronously demodulated (after being detected 256 and amplified 258) against dither signal 248 by synchronous demodulator 260. The resultant correction signal 262 is applied to tune VCO 244 and cause frequency fluctuations within the linewidth (e.g., 1 KHz to 10 KHz) of cell 230 to be corrected in the sideband 241 produced by modulator 240. Beamsplitter 243 extracts an output beam 264 for system from sideband 241, which is both non-dithered and stabilized from frequency fluctuations.

Note that because linewidth 234 is narrow, the frequency of output beam 264 is accurately set to within a fraction of the center frequency of linewidth 234 by servo loop 204. Thus, the frequency of output beam 264 is tied to the narrow molecular resonance of cell 230. Thus, system 200 is suitable for use as an optical clock in which the frequency of output beam 264 should be as accurate as possible. Moreover, multiple optical clocks constructed identically as system 200 will produce synchronous output beams 264 having frequencies that are all equal to a high degree of accuracy, such as to 1 part in $10^{12}$ or possibly even higher. Accordingly, such multiple optical clocks can be used an independently operating frequency references in applications which require such high precision, independent clocks.

The dither frequency should be faster than the nominal rate at which the frequency fluctuations are expected to change so that the absorption linewidth is being probed at a rate that exceeds the rate of change of the frequency fluctuations (although the dither frequency need not exceed the largest expected magnitude of the frequency fluctuations). However, the dither frequency should not be higher than the breadth of the absorption linewidth being used by the servo loop. For example, while the dither frequency can be, e g., 100 KHz in servo loop 202, dither oscillator 250 in servo loop 204 should operate at a lower frequency (e.g., 10 KHz) in view of the narrowness of linewidth 234.

Frequency control servo loop 204 includes two power level control loops 270, 272, each of which is shown as having the same construction as power level control loop 70 (FIG. 1). Other configurations (such as that of power level control loop 170 (FIG. 4) can be used instead for either or both of loops 270, 272. Power level control loops 270, 272 serve to stabilize the power levels of the sidebands produced by modulators 240, 242, respectively, in a manner discussed in detail above. As a result, distortion of linewidth 234 due to power level fluctuations in sideband radiation 252 are greatly reduced.

It is important to note that the concept of using successive frequency control loops that employ successively narrower absorption resonance linewidths can be applied to systems containing more than two frequency control loops. Also, some applications may not require that the output beam of each loop be non-dithered. The sequential frequency control using a plurality of molecular resonances at successively narrower linewidths is an important feature of the invention and provides a wide dynamic range of response, thereby making it possible to achieve frequency stabilization in the presence of sizeable vibrations in the environment of the laser.

Figure 7:
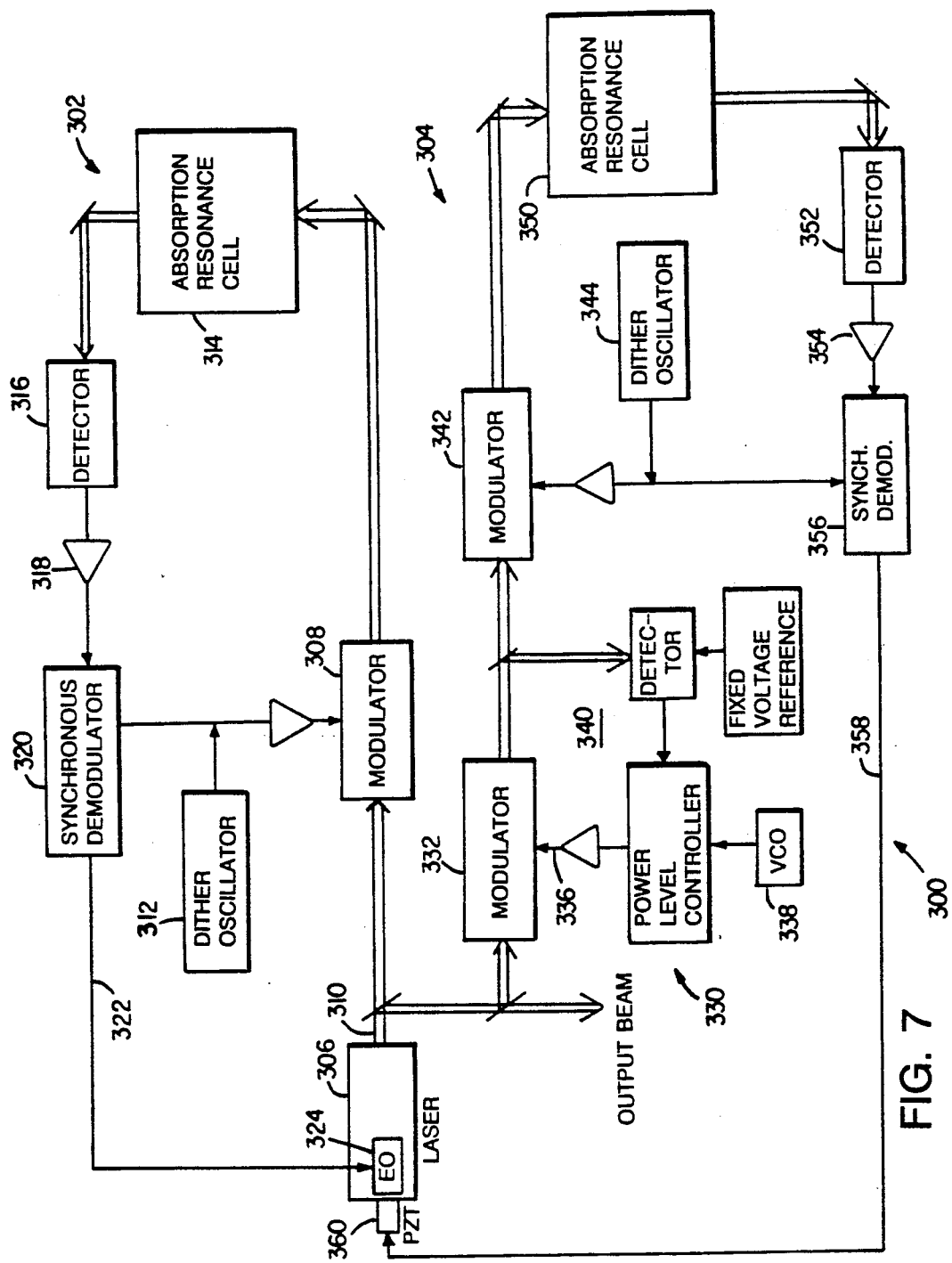
FIG. 7 is a block diagram of another embodiment of a two-stage, sequential system for controlling the frequency of a laser according to the invention.

Referring to FIG. 7, laser system 300 includes a pair of successive frequency control servo loops 302, 304 that each apply correction signals to tune the laser 306. Frequency control servo loop 302 is shown as having the same general configuration as servo loop 202 of system 200 (FIG. 6). Servo loop 302 does not include a power control loop, but one can be added if desired.

Modulator 308 is an electro optical device and dithers the frequency of the beam 310 produced by laser 306 (which is, e.g., a $CO_2$ laser) according to the modulation signal provided by dither oscillator 312. The dithered beam is applied to broad linewidth resonance absorption cell 314 (which contains e.g., $SF_6$). The absorption response of cell 314 is detected 316, amplified, 318, and synchronously demodulated 320 against the modulation signal, all as discussed above. The resultant correction signal 322 is applied to electro-optic crystal 324 in laser 306 to tune the laser and stabilize the frequency of beam 310.

A fraction of the radiation of frequency stabilized (and non-dithered) beam 310 is applied to frequency control servo loop 304 via a frequency shifting stage 330. Modulator 332 (e.g., an acousto-optic device) produces a sideband 334 of beam 310 in response to a modulation signal 336 produced by VCO 338. The frequency of modulation signal 336 is selected so that the nominal frequency of the beam applied to the narrow linewidth absorption resonance cell 350 of servo loop 304 is at the center of the absorption linewidth.

Frequency shifting stage 330 also includes a power level control loop 340 (shown as being identical power level control loop 70 of FIG. 1). This stabilizes the power level of sideband 334 from fluctuations introduced by modulator 332.

The frequency of sideband 334 is dithered by modulator 342 in response to a dithered modulation signal produced by dither oscillator 344, and the frequency dithered beam is applied to narrow linewidth absorption resonance cell 350. Cell 350 contains, e.g., $SF_6$; its absorption response is detected 352, amplified 354, and applied to synchronous demodulator 356 along with the (suitably phase shifted) dither signal. The resulting correction signal 358 is applied to PZT 360 mounted to one of the mirrors of laser 306 to cause the laser to be tuned to stabilize beam 310 (and hence the output beam 362 of system 300) from residual frequency fluctuations and control the frequency of beam 362 with respect to the center of the narrow absorption linewidth used by loop 304.

Figure 8:
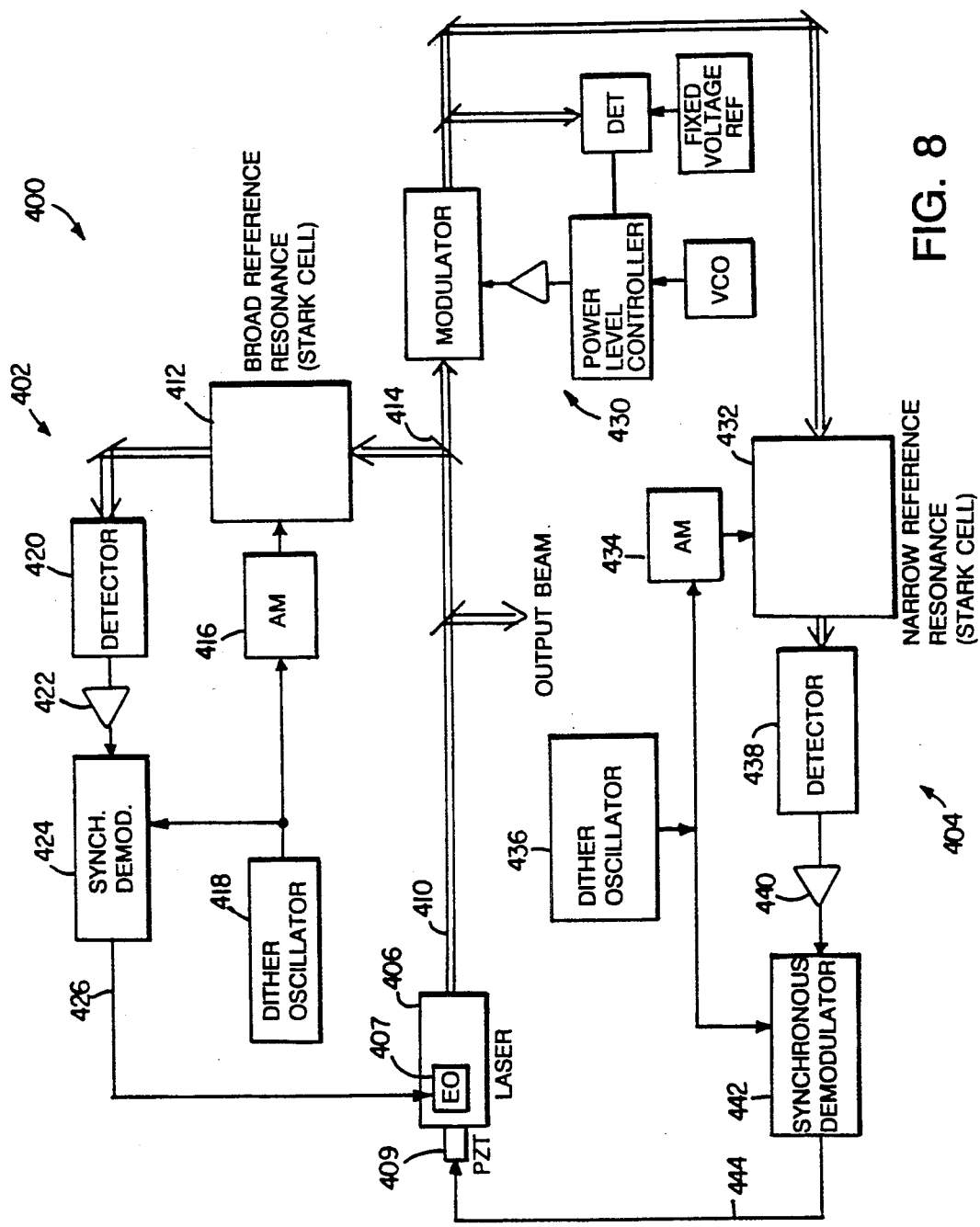
FIG. 8 is a block diagram of yet another embodiment of a two-stage, sequential system for controlling the frequency of a laser according to the invention.

Referring to FIG. 8, laser system 400 includes two sequential frequency control servo loops 402, 404 which use successively narrower molecular absorptions to stabilize the frequency of beam 410 produced by a $CO_2$ laser 406. However, the respective absorption resonances used by loops 402, 404 are dithered in place of dithering the frequency of the laser beam.

Servo loops 402, 404 include respective stark cells 412, 432, each of which contains Dueterated ammonia ($NH_2O$) as an absorption medium. The respective pressures of the media are selected so that the absorption linewidth in the medium of cell 412 is broader than that of cell 432.

A fraction of beam 410 is applied to cell 412. The resulting absorption response is dithered by amplitude modulating 416 a DC electric field applied across the molecules of the media at a frequency provided by dither oscillator 418. The dithered absorption response is detected 420 and amplified 422 before being applied to synchronous demodulator 424. Demodulator 424 is synchronized to the dither signal from oscillator 418 as discussed in detail above, and produces a correction signal 426 which is applied to elector-optic crystal 407 in laser 406. Correction signal 426 causes laser 406 to be tuned to stabilize the frequency of beam 410 from frequency fluctuations.

Beamsplitter 414 applies the remainder of beam 410 to stark cell 432 via power level control loop 430. Power level control loop 430 is shown having the same configuration as loop 70 (FIG. 1), but other configurations, e.g., that of loop 170 (FIG. 4) can be used instead.

The absorption response of cell 432 is dithered by amplitude modulating a DC electric field applied to the absorption medium at a rate defined by the frequency of dither oscillator 436. The dither signal is also applied (after suitable phase shifting) to synchronous demodulator 442. The dithered absorption response is detected 438, amplified 440, and then demodulated 442 to produce correction signal 444. Correction signal 444 is applied to PZT to tune laser 406, as discussed in detail above.

Media other than $SF_6$ may be used in the absorption resonance cells for all of the frequency control servo loops discussed in this specification. For example, referring to FIG. 1, osmium tetroxide ($OsO_4$) has been found to be a good candidate for use in absorption cell 32 with a $CO_2$ laser. The resonance belonging to the $\nu_3$ band of $OsO_4$ occurs near the center of the P(20) line of a $^{12}C^{16}O_2$ laser (and there is also a well defined resonance near the P(14) line of such a laser).

In some applications, it is preferable to use a laser with a different lasing frequency than that provided by a $^{12}C^{16}O_2$ laser. For example, in applications in which the output beam (e.g., beam 50, FIG. 1) is to be transmitted through the atmosphere, a $^{13}C^{16}O_2$ laser (i.e., using the carbon-13 isotope) is preferred because its beam (the P(20) line of which has a wavelength of approximately 11.19 microns) exhibits improved transmission through the atmosphere. One way to frequency stabilize a carbon-13 laser is with a carbon-12 laser that is itself frequency stabilized using one of the techniques of the invention. In such an arrangement, the beam of the carbon-13 laser is stabilized against the frequency stabilized carbon-12 laser beam.

Another, less complex solution is to frequency stabilize the beam of the $^{13}C^{16}O_2$ laser directly using one of the arrangements described above. For example, the two stage optical clock 200 (FIG. 6) can be used with a $^{13}C^{16}O_2$ laser 208. $SF_6$ or $OsO_4$ would no longer be a good choice for the medium of absorption cells 210, 230, due to the change in laser frequency. An absorption medium with a resonance at 11.19 microns is needed, and it has been found that sulfuryl fluoride ($SO_2F_2$) possesses a set of resonances close to the frequency of the P(20) line of $^{13}C^{16}O_2$. Sulfuryl fluoride may be used to provide broad and narrow linewidths (e.g., linewidths 214, 234, FIG. 6) by adjusting, e.g., the pressure of the $SF_2O_2$.

As an alternative to acousto-optic modulators (which are configured as a pair of germanium crystals as discussed above), electro-optic (EO) devices (e.g., comprising a CdTe crystal) may be employed. The modulation signal for an EO modulator can have a sizably higher frequency than the frequency limit of an AO modulator. That is, while the frequency limit for an AO modulator is up to several hundred MHz, EO crystals can be used at modulation frequencies as high as the microwave region in X band or K band. Moreover, EO modulators are not subject to the same degree acoustical delay of AO modulators and therefore exhibit improved response time. Also, sidebands produced by an EO modulator emerge along the same direction without beam deflection. The sidebands can be separated by known interferometric techniques. A single sideband can be generated by using the EO modulator in a phase matched configuration, which causes a buildup of radiation in one of the sidebands.

As an alternative to using synchronous demodulation to detect the frequency fluctuations, the absorption response can be digitally sampled to sense the center frequency of resonance where maximum absorption occurs. The correction signal would then be developed from the sampling.

The absorption resonance cells need not all be Doppler free devices. Particularly where the absorption linewidth is to be very broad, a Doppler broadened absorption cell can alternatively be used. Linewidths as broad as 25 MHz to 30 MHz can thereby be obtained.

Other embodiments are within the scope of the following claims.

I claim:

1. A system for stabilizing frequency fluctuations in a laser beam produced by a laser, comprising a frequency stabilization stage that includes:
    A. a dither modulator external to the laser for dithering the frequency of said laser beam,
    B. an absorption resonance cell having a resonance at a predetermined linewidth to which said frequency dithered beam is applied.
    C. a synchronous demodulator synchronized to the dithering for producing a correction signal that represents said frequency fluctuations with respect to a reference frequency within said linewidth by demodulating an output of said cell, and
    D. means for using said correction signal to correct for said frequency fluctuations and produce as an output of said stage a non-dithered beam stabilized from said frequency fluctuations, said means for using said correction signal comprising:
        a modulator for generating a sideband of said laser beam, said sideband serving as said output of said stabilization stage,
        a voltage controlled oscillator for applying a modulation signal to said sideband modulator, said modulation signal selected to cause said modulator to produce said sideband at a frequency shifted from a nominal frequency of said laser beam, and
        means for using said correction signal to tune said voltage controlled oscillator to cause said frequency fluctuations to be stabilized in said sideband.

2. The system of claim 1 wherein said reference frequency within said resonance linewidth is different from said nominal frequency by an amount substantially equal to the shift produced by said sideband modulator.

3. A system for stabilizing frequency fluctuations in a laser beam produced by a laser, comprising:
    a frequency stabilization stage that includes:
        A. a dither modulator external to the laser for dithering the frequency of said laser beam, B. an absorption resonance cell having a resonance at a predetermined linewidth to which said frequency dithered beam is applied, C. a synchronous demodulator synchronized to the dithering for producing a correction signal that represents said frequency fluctuations with respect to a reference frequency within said linewidth by demodulating an output of said cell, and D. means for using said correction signal to correct for said frequency fluctuations and produce as an output of said stage a non-dithered beam stabilized from said frequency fluctuations;

at least a second frequency stabilization stage that includes:

A. a second dither modulator for dithering the frequency of the output of said first mentioned stage, B. a second absorption resonance cell having a resonance at a second predetermined linewidth narrower than the resonance linewidth of the first cell, the output of said second dither modulator being applied to said second cell, C. a second synchronous demodulator synchronized to the second dithering for producing a second correction signal that represents residual frequency fluctuations in said output of said first stage with respect to a reference frequency within said second linewidth by demodulating the output of said second cell, and D. means preceding said second dither modulator for using said second correction signal to correct for said residual frequency fluctuations and produce as an output of said second stage a non dithered beam stabilized from said residual frequency fluctuations, said means preceding said second dither modulator comprising:

a modulator for generating a sideband of said output of said first stage, said sideband serving as the output of said second stabilization stage, a voltage controlled oscillator for applying a modulation signal to said sideband modulator, said modulation signal selected to cause said modulator to produce said sideband at a frequency shifted from a nominal frequency of said output of said first stage, and means for using said second correction signal to tune said voltage controlled oscillator to cause said frequency fluctuations to be stabilized in said sideband.

4. A system for stabilizing frequency fluctuations in a laser beam produced by a laser, comprising a frequency stabilization stage that includes:

A. a dither modulator external to the laser for dithering the frequency of said laser beam, B. an absorption resonance cell having a resonance at a predetermined linewidth to which said frequency dithered beam is applied, C. a synchronous demodulator synchronized to the dithering for producing a correction signal that represents said frequency fluctuations with respect to a reference frequency within said linewidth by demodulating an output of said cell, D. means for using said correction signal to correct for said frequency fluctuations and produce as an output of said stage a non-dithered beam stabilized from said frequency fluctuations, and E. means for stabilizing the power level of the laser beam before the beam is applied to said absorption cell, said power level stabilization means including:

a modulator for generating a sideband of said beam, a voltage controlled oscillator for applying a modulation signal to said sideband modulator to cause said sideband to be generated, means for detecting power level variations in said sideband, and means for varying the level of said modulation signal to correct for said power level variations in said sideband and stabilize the power level of said sideband.

5. The system of claim 4 wherein said sideband is applied directly to said absorption cell.

6. The system of claim 4 wherein said means for detecting comprises a detector for comparing the power level of said sideband to a fixed reference voltage.

7. The system of claim 4 wherein said means for detecting comprises means for modulating the amplitude of the sideband at a predetermined rate, and a synchronous demodulator synchronized to the predetermined rate for demodulating the amplitude modulated sideband to produce an error signal representative of said power level variations on said sideband.

8. The system of claim 4 wherein said means for varying the level of said modulation signal comprises a variable attenuator.

9. The system of claim 4 wherein said means for varying the level of said modulation signal comprises a variable gain amplifier.

10. A system for controlling the frequency of a laser beam produced by a laser, the laser radiation of said beam being subject to frequency fluctuations, said system comprising:

A. a plurality of successive frequency stabilization stages, each comprising an independent control loop incorporating a respective absorption resonance cell and constructed to produce frequency correction referenced upon a predetermined resonance of said absorption cell, B. the predetermined reference resonances of successive absorption resonance cells having successively narrower linewidths, each successive frequency stabilization stage, referenced on its predetermined resonance, serving to reduce the range of frequency fluctuations of its output relative to its input, and C. at least one of said control loops comprising:

a dither modulator external to the laser for dithering the frequency of said laser beam, said frequency dithered beam being applied to the absorption resonance cell of said loop, a synchronous demodulator synchronized to said dithering for producing a correction signal that represents said frequency fluctuations with respect to a reference frequency within the linewidth of the cell of said loop by demodulating an output of said cell, and means for using said correction signal to correct for said frequency fluctuations and produce as an output of said stage a non-dithered beam stabilized from said frequency fluctuations, said means for using said correction signal including:

a modulator for generating a sideband of said laser beam, said sideband serving as said output of said stabilization stage; a voltage controlled oscillator for applying a modulation signal to said sideband modulator, said modulation signal selected to cause said modulator to produce said sideband at a frequency shifted from a nominal frequency of said laser beam; and, means for using said correction signal to tune said voltage controlled oscillator to cause said frequency fluctuations to be stabilized in said sideband.

11. The system of claim 10 wherein said reference frequency within said linewidth is different from said nominal frequency by an amount substantially equal to the shift produced by said sideband modulator.

12. A system for controlling the frequency of a laser beam produced by a laser, the laser radiation of said beam subject to frequency fluctuations, said system comprising:
   A. a plurality of successive frequency stabilization stages, each comprising an independent control loop incorporating a respective absorption resonance cell and constructed to produce frequency correction referenced upon a predetermined resonance of said absorption cell,
   B. the predetermined reference resonances of successive absorption resonance cells having successively narrower linewidths, each successive frequency stabilization stage, referenced on its predetermined resonance, serving to reduce the range of frequency fluctuations of its output relative to its input, and
   C. means for stabilizing the power level of the laser beam before the beam is applied to at least one of said absorption cells, said power level stabilization means including:
      a modulator for generating a sideband of said beam,
      a voltage controlled oscillator for applying a modulation signal to said sideband modulator to cause said sideband to be generated,
      means for detecting power level variations in said sideband, and
      means for varying the level of said modulation signal to correct for said power level variations in said sideband and stabilize the power level of said sideband.

13. The system of claim 12 wherein said sideband is applied directly to said absorption cell.

14. The system of claim 12 wherein said means for detecting comprises a detector for comparing the power level of said sideband to a fixed reference voltage.

15. The system of claim 12 wherein said means for detecting comprises
   means for modulating the amplitude of the sideband at a predetermined rate, and
   a synchronous demodulator synchronized to the predetermined rate for demodulating the amplitude modulated sideband to produce an error signal representative of said power level variations on said sideband.

16. The system of claim 12 wherein said means for varying the level of said modulation signal comprises a variable attenuator.

17. The system of claim 12 wherein said means for varying the level of said modulation signal comprises a variable gain amplifier.

* * * * *